United States Patent Office 3,094,508
Patented June 18, 1963

3,094,508
BRANCHED POLYCARBONATE AND PROCESS FOR PREPARING SAME
Richard Butterworth, Manor Township, Lancaster County, and John A. Parker, Lancaster Township, Lancaster County, Pa., assignors to Armstrong Cork Company, Lancaster, Pa., a corporation of Pennsylvania
No Drawing. Filed Apr. 16, 1959, Ser. No. 806,788
7 Claims. (Cl. 260—47)

This invention relates to a new polycarbonate, and more particularly to a branch polycarbonate having a molecular weight between about 200,000 and 500,000. The invention is also concerned with the process of making such a polymer.

According to this invention, superior and useful alkylidene polycarbonates are prepared by using a mixture of specified bis-phenols as a starting mixture, and by careful temperature control during polymerization. The invention contemplates forming in water a solution of the water-soluble salts of a mixture of bis-phenols, containing 90–99.5% by weight of bis-(4-hydroxyl phenyl) alkane and 0.5–10% by weight of bis-(4-hydroxyl-1-alkylidene-phenyl) phenol. The alkane and alkylidene groups contain 1–7 carbon atoms. The water solution thus formed is utilized to establish a reaction mixture which contains said salts and 5–95% by weight of the reaction mixture of an organic, water-immiscible solvent capable of dissolving the final polycarbonate product. The water solution of the bis-phenols and the organic solvent are formed into an emulsion. The emulsified reaction mixture is then maintained at a temperature in the range of 28°–34° C. while phosgene and the reaction mixture are brought into reactive contact. Sufficient phosgene will be used to form the final phenylene polycarbonate having a molecular weight in the range of 200,000–500,000; the amount of phosgene will be that equivalent on a mole basis to the moles of total bis-phenol present in the water phase of the reaction mixture.

The bis-phenol which forms the major proportion of the starting material of the present invention is that having the general structure HO—Ar—A—Ar—OH wherein Ar is an arylene hydrocarbon radical and A is a bivalent saturated aliphatic hydrocarbon radical containing 1–7 carbon atoms. These bis-phenols include bis-(4-hydroxyl phenyl) methane; 2,2-bis-(4-hydoxyl phenyl) propane; 2,2-bis-(4-hydroxyl phenyl) butane; 2,2-bis-(4-hydroxyl phenyl) 4-methyl pentane; 1,1-bis(4-hydroxyl phenyl) ethane; bis-(4-hydroxyl-2,6-dimethyl phenyl) methane; 1,1-bis-(2,5-dimethyl-4-hydroxyl phenyl) propane; 2,2-bis-(3-methyl-4-hydroxyl phenyl) propane; 2,2-bis-(3-isopropyl-4-hydroxyl phenyl) propane; 2,2-bis-(3-phenyl-4-hydroxyl phenyl) propane; 2,2-bis-(4-hydroxyl phenyl) heptane; 3,3-bis-(4-hydroxyl phenyl) pentane; 1,2-bis-(4-hydroxyl phenyl) ethane; 1,2-bis-(2-hydroxyl phenyl) ethane; 1,5-bis-(4-hydroxyl phenyl) pentane; 1,3-bis-(4-hydroxyl phenyl) 2,2-diethyl propane and the like. One or the other of these bis-phenols, or mixtures thereof, constitutes the balance of the phenolic starting material of the present invention. As stated earlier, this phenol will comprise 90–99.5% by weight of the mixture of statring bis-phenols.

The other bis-phenol which must be present in the starting mixture of bis-phenols is a 2,4-bis-(4-hydroxylphenyl alkylidene) phenol having the formula

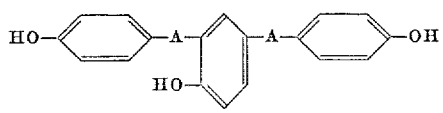

wherein each A is an alkylidene group containing 1–7 carbon atoms. This particular bis-phenol is to be used in the starting mixture of bis-phenols in an amount of 0.5–10% by weight of the starting bis-phenols. This bis-phenol provides a three-dimensional network which, nevertheless, will not gel under proper conditions of temperature control. Therefore this bis-phenol imparts high temperature resistance and high molecular weight to the final polycarbonate. In any case it has been found that polycarbonates prepared in the absence of a minor amount of bis-phenol do not have improved properties; if the trifunctional bis-phenol is not used in the specified amounts as defined herein, such properties as tensile strength, clarity of film, temperature resistance, solvent resistance, and toughness are drastically impaired.

The bis-phenol starting mixture containing the two hisphenols in the proportions stated must be dissolved in water. This is best accomplished by adding the bis-phenol mixture to a strongly alkaline aqueous solution. The desired degree of alkalinity can be achieved by use of alkali metal hydroxides, ammonium hydroxide, or the organic amines. Sufficient of the alkaline material should be used to form water-soluble salts of the bis-phenol mixture. Customarily, a slight excess of the alkaline material will generally be desirable in order to insure complete solubility of the bis-phenols in the aqueous alkaline solution. The concentration of the bis-phenol salts in the aqueous solution is not critical, but generally it will be in the range of about 1%–20% by weight. As a practical matter, it is solely the handleability of the bis-phenol salt solution which will control the concentration of the water-soluble bis-phenol salt in that aqueous solution. A preferred concentration will generally be in the range of 15–18% by weight water-soluble salt.

Once the aqueous solution of water-soluble salts of the bisphenols has been formed, it becomes necessary to establish a reaction mixture by admixing with the aqueous solution a water-immiscible organic solvent capable of dissolving the final polycarbonate product to be formed. This solvent preferably will be a chlorinated hydrocarbon solvent such as methylene chloride, ethylene dichloride, and similar chlorinated alkanes containing 1–6 carbon atoms. Tetrahydrofurane is also a suitable solvent. The precise nature of this solvent is not critical so long as it is water-insoluble, and will dissolve the finished polycarbonate. The amount of the organic solvent should be in the range of 5%–95% by weight based on the total weight of the reaction mixture. As pointed out earlier, the reaction mixture will include the aqueous solution of salts of the bis-phenols, the organic solvent, and preferably a small amount of a catalyst-like material to be described below. The reaction mixture during agitation will be in the form of an emulsion. If about 5% by weight of the aqueous solution is used in the reaction mixture, the emplsion will be a water-in-oil type; if, on the other hand, about 5% by weight of the inorganic solvent is used, the balance being the aqueous solution of bis-phenols, the emulsion will be of the oil-in-water type. A preferred emulsion will contain 40–60% by weight of aqueous solution, and correspondingly, 60–40% by weight of the organic solvent.

The so-called catalyst will be present in the reaction mixture in an amount of about 0.01–5% by weight of the total reaction mixture. The catalyst, at least in part, operates as an emulsifying agent. The catalyst may be a quaternary ammonium salt having the general formula

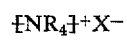

wherein X is a halogen, most usually chlorine. The R will be the usual mixture of hydrogen, alkyl groups, or other monovalent organic radicals. The alkyl group can be methyl, ethyl, propyl, right on up to octadecyl. One useful catalyst-like substance contains for the R groups in the above formula two methyls, an ethyl, and a diisobutylphenoxyethoxy group, and the halogen is chlorine. Another workable catalyst is the substance N,N-dimethyl aniline. These catalyst-like substances are simply dissolved in the reaction mixture prior to stirring to form the emulsion; this follows since a large part of the role of the catalyst-like substances is that of an emulsification agent.

Once agitation has established the reaction mixture in the form of an emulsion, the next step contemplates contacting the reaction mixture with phosgene. Phosgene has the formula $COCl_2$ and is most conveniently introduced into the reaction mixture in the form of a gas. The amount of phosgene to be added will be equivalent on a mole-for-mole basis with the amount of bis-phenol present in the reaction mixture. One readily discernible end point is the sudden drop in the pH of the reaction mixture once all of the bis-phenols have reacted with the phosgene. When there is no longer any bis-phenol to react with the phosgene, the phosgene will react with the water in the aqueous system to produce carbon dioxide and hydrochloric acid. This released hydrochloric acid causes a sudden and marked drop in the pH of the reaction mixture, and this drop can be used as an end point if desired. The approach of the end point can be easily determined simply by metering into the reaction mixture the phosgene, or otherwise keeping track of the amount of phosgene that enters the reaction mixture in order that the molar amounts may be known.

The most critical portion of the entire process—in addition to the defined starting mixture of bis-phenols—is the temperature which must be maintained in the reaction mixture while the phosgene is being contacted therewith. This temperature must be greater than 28° C., since temperatures lower than 28° C. produce a lower molecular weight polymer having less desirable properties. On the other hand, temperatures higher than 34° C. will cause the reaction mixtures to form a gel; cross-linking occurs and useless polymer of enormous molecular weight results. In the temperature range of 32° C. to 34° C., care must be used to avoid gelation, but this care is readily accomplished by those skilled in the art. The best polymer is produced by conducting the reaction at a temperature as close as possible to 34° C. without causing gelation. It will be appreciated that other factors will play a role here and will exert some effect on whether the reaction is conducted at 30°, 31°, 32°, within the range 28°–34° C. The concentration of the water-soluble salts of the original bis-phenols in the aqueous solution will have a definite effect, with more dilute solutions allowing use of slightly higher temperatures. Relatively larger amounts of the organic solvent in relation to the aqueous system will also allow use of slightly higher temperatures within the defined range.

When the end point of the reaction has been reached, as defined earlier, the phenylene polycarbonate of the present invention will be found in the solvent layer. Accordingly, the solvent layer may be separated as by decantation, and washed if desired. This solvent layer as it exists may be used without any further treatment whatsoever to form tough, strong, clear films on floorings, desk tops, counter tops, and other kinds of surface coverings. The films possess extraordinary tensile strength and elasticity, and are particularly characterized in their optical perfection. The molecular weight of the polycarbonate in these films is—if the present invention is followed—in the range 200,000–500,000, and still the film can be easily deposited from the solvent without fear of blistering, pinholing, or forming any other of the defects commonly encountered in polycarbonate films.

If desired, the polycarbonate may be precipitated from the solvent layer with some nonsolvent such as methyl alcohol and recovered in the form of a white powder. This powder may be extruded in the usual fashion to form films, or to form other shapes commonly prepared by the known extrusion processes. Alternatively, the solvent containing dissolved polycarbonate may be poured into boiling water to boil off the solvent, leaving the fibrous mass of polycarbonate in the water. Normal drying will then produce the dry, extrudable polycarbonate powder. This powder may again be taken up in solvents therefor in order to form a film-forming solution wherein the solvent has the desired property. Suitable solvents are the chlorinated hydrocarbons, xylene, benzene, toluene, and other aromatic hydrocarbons. Additionally, esters and ketones can be used as solvents.

One of the particular advantages of films formed from the polycarbonates of the present invention is the high melting and softening points. A cast film 3 mils in thickness softens at about 228–230° C. The melting point of the polycarbonate is greater than 300° C. This high melting point reflects the high molecular weight of the material of the present invention. At the same time the great flexibility of films and objects formed from this material would not at all be expected from the molecular weights of the products obtained.

The following examples illustrate several specific embodiments of the present invention. All parts are by weight unless otherwise stated.

*Example 1*

To 500 parts of a 10% sodium hydroxide solution were added 74.5 parts of 2,2-bis-(4-hydroxyl phenyl) propane and 1.5 parts 2,4-bis-(4-hydroxylphenylisopropylidene) phenol, and the mixture was stirred until the bis-phenol had dissolved. The solution was then placed in a three neck glass flask fitted with a gas inlet, thermometer, and stirrer. To the solution were added 400 parts methylene chloride and 1 part of the compound benzyl dimethyl stearyl ammonium chloride (Triton X 400). The mixture was agitated to form an emulsion while warming to 28° C. Phosgene was then bubbled into the stirred emulsion over a period of two hours, with care being taken to maintain the temperature between 28° and 32° C.

The reaction mixture was diluted with 900 parts chloroform, and the water layer decanted. The chlorinated hydrocarbon layer was washed twice with equal volumes of water, and was then poured slowly into boiling water. The precipitated polymer was then filtered and dried in an oven maintained at 100° C. The resulting polycarbonate had a melting point greater than 300° C. on a block.

A solution of polycarbonate in chloroform containing 15% by weight of polycarbonate was drawn on a polyethylene sheet to form a film. The tensile strength of the resulting film was between 400 and 450 kilograms per square centimeter with an elongation of between 10 to 15%.

*Example 2*

Into a 22-liter flask, fitted with gas inlet tube, gas outlet tube, stirrer and thermometer, were placed 1400 parts 2,2-bis-(4-hydroxyl phenyl) propane and 70 parts 2,4-bis-(4-hydroxyl phenyl isopropylidene) phenol, 545 parts sodium hydroxide dissolved in 8 liters of water, 8 liters of methylene chloride, and 20 parts of benzyl dimethyl stearyl ammonium chloride. The flask was cooled in a large bucket of ice water. Phosgene was passed into the violently stirred solution for a period of two hours. The temperature was maintained between 27°–31° C. during the entire period. At the end of this time the solution was thick and tested acid. Eight liters of chloroform was added and the solution was washed with 5 liters of water three times. A portion of the polymer was precipitated from the hydrogenated hydrocarbon solvent with methyl alcohol. The resin had a melting point above 300° C. Films cast from methylene chloride had the following properties: a tensile yield strength of 8900 pounds per square foot, an elongation of 11%, a molecular weight as determined by light scattering of 267,000.

Example 3

This example was run to determine the effect of reduced reaction temperature on the properties of the final polycarbonate product.

Example 1 was repeated save that phosgene was passed into the solution for 75 minutes while the temperature was maintained between 25° C. and 27° C. by cooling the flask in ice water. The resulting resin melted at about 240° C. and had a molecular weight as determined by light scattering of 36,100.

Example 4

Into a flask equipped with gas tubes, thermometer, and stirrer, were placed 9 parts of 2,2-bis-(hydroxyl phenyl) propane, 1 part 2,4-bis-(4-hydroxyl phenyl isopropylidene) phenol, a solution of 40 parts sodium hydroxide dissolved in 100 parts of water, 102 parts methylene chloride, and 2 parts N,N-dimethyl aniline. Phosgene was added for 11 minutes while the temperature was maintained between 27°–29° C. The methylene chloride solution was washed 3 times with an equal volume of water, after which the resin was precipitated with methyl alcohol. The resin formed a clear film with excellent properties and had a molecular weight of 210,000.

I claim:

1. A method of preparing a branched polycarbonate comprising forming in water a solution of water-soluble salts selected from the group consisting of alkali metal salts, ammonium salts, and organic amine salts, of a mixture of bis-phenols containing 90–99.5% by weight of bis-(4-hydroxyl phenyl) alkane and 0.5–10% by weight of a 2,4-bis-(4-hydroxylphenyl alkylidene) phenol having the structure

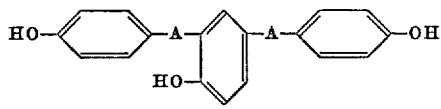

wherein said alkane and alkylidene groups contain 1–7 carbon atoms, establishing in the form of an emulsion a reaction mixture containing said solution and an inert organic solvent immiscible with water but capable of dissolving the final polycarbonate, said emulsion being formed by agitation and by adding up to about 5% by weight of said reaction mixture of an emulsifying agent, said reaction mixture containing 5–95% by weight of said organic solvent, maintaining said reaction mixture at a temperature sufficiently low to avoid gelation in the range of 28°–34° C., and passing phosgene on a mole-for-mole basis with said mixture of bis-phenols into said reaction mixture maintained at said temperature to form the branched polycarbonate soluble in said organic solvent.

2. The method according to claim 1 wherein said mixture of bis-phenols contains 90–99.5% by weight of 2,2-bis-(4-hydroxyl phenyl) propane.

3. A process according to claim 1 wherein said mixture of bis-phenols contains 0.5–10% by weight of 2,4-bis-(4-hydroxyl phenyl isopropylidene) phenol.

4. A method according to claim 1 wherein said reaction mixture contains 40–60% by weight of said solution and 60–40% by weight of said organic solvent.

5. A process according to claim 1 wherein said organic solvent comprises methylene chloride.

6. A process according to claim 1 wherein said organic solvent comprises tetrahydrofurane.

7. A process according to claim 1 wherein said mixture of bis-phenols contains about 98% by weight of bis-(4-hydroxyl phenyl) alkane and about 2% by weight of bis-(4-hydroxyl phenyl alkylidene) phenol.

References Cited in the file of this patent

UNITED STATES PATENTS 2,950,266     Goldblum _____ Aug. 23, 1960

OTHER REFERENCES

Schnell: Angew. Chemie, 68 (No. 20), 633–640 (1956).
Schmidt et al.: "Principles of High Polymer Theory and Practice," McGraw-Hill; 1948.

UNITED STATES PATENT OFFICE

CERTIFICATE OF CORRECTION

Patent No. 3,094,508            June 18, 1963

Richard Butterworth et al.

It is hereby certified that error appears in the above numbered patent requiring correction and that the said Letters Patent should read as corrected below.

Column 1, line 51, for "1,1-bis(4-hydroxyl" read -- 1,1-bis-(4-hydroxyl --; line 63, for "statring" read -- starting --; column 2, line 11, after "of" insert -- this --; line 16, for "his-" read -- bis- --; line 36, for "bisphenols" read -- bis-phenols --; line 55, for "emplsion" read -- emulsion --.

Signed and sealed this 7th day of January 1964.

(SEAL)
Attest:

ERNEST W. SWIDER
Attesting Officer

EDWIN L. REYNOLDS

Acting Commissioner of Patents